(12) United States Patent
Misunou et al.

(10) Patent No.: US 8,496,303 B2
(45) Date of Patent: Jul. 30, 2013

(54) PUMP ASSEMBLY

(75) Inventors: Masaki Misunou, Atsugi (JP); Chiharu Nakazawa, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 285 days.

(21) Appl. No.: 12/879,236

(22) Filed: Sep. 10, 2010

(65) Prior Publication Data

US 2011/0062773 A1    Mar. 17, 2011

(30) Foreign Application Priority Data

Sep. 17, 2009   (JP) .................................. 2009-215912

(51) Int. Cl.
*B60T 8/40* (2006.01)
*F01C 1/08* (2006.01)

(52) U.S. Cl.
USPC .......... 303/116.4; 418/15; 418/206.4; 303/10

(58) Field of Classification Search
USPC .................. 303/116.4, 10, DIG. 10; 418/199, 418/200, 205, 206.1, 206.4, 15
See application file for complete search history.

(56) References Cited

U.S. PATENT DOCUMENTS

| 2,665,638 | A | * | 1/1954 | Lauck | 418/69 |
| 2,697,987 | A | * | 12/1954 | Barclay | 418/206.1 |
| 2,855,854 | A | * | 10/1958 | Aspelin | 418/206.6 |
| 3,029,740 | A | * | 4/1962 | Maisch | 418/206.4 |
| 3,213,803 | A | * | 10/1965 | Meyer | 418/255 |
| 6,402,266 | B1 | | 6/2002 | Ariki et al. | |

FOREIGN PATENT DOCUMENTS

JP    2001-80498    3/2001

* cited by examiner

*Primary Examiner* — Thomas J Williams
(74) *Attorney, Agent, or Firm* — Antonelli, Terry, Stout & Kraus, LLP.

(57) ABSTRACT

A pump assembly including a housing, a pump unit having a low pressure portion and a high pressure portion and accommodated in a pump unit receiving portion which is formed in the housing, a suction passage, a low pressure chamber communicated with the suction passage and the low pressure portion, and a discharge passage, wherein when the pump unit is accommodated in the pump unit receiving portion, the low pressure chamber is formed between the pump unit and a wall surface of the housing which defines the pump unit receiving portion, and the discharge passage is formed by a communication pipe which extends through the low pressure chamber and communicates the housing and the high pressure portion of the pump unit with each other.

11 Claims, 8 Drawing Sheets

PUMP ASSEMBLY

BACKGROUND OF THE INVENTION

The present invention relates to a pump assembly.

Japanese Patent Application Unexamined Publication No. 2001-80498A discloses a pump apparatus including a pump body accommodated in a housing and fluid chambers disposed between the pump body and the housing. The fluid chambers include a low fluid pressure chamber, a high fluid pressure chamber, a high fluid pressure chamber and a low fluid pressure chamber which are arranged in this order in an axial direction of the pump body. These fluid chambers are separated from each other by O rings which are disposed between the adjacent fluid chambers.

SUMMARY OF THE INVENTION

In the above-described pump apparatus of the conventional art, the fluid chambers are arranged in the axial direction of the pump body, so that there will occur increase in the axial length of the pump assembly, and the pump apparatus must be upsized.

It is an object of the present invention to solve the above-described problem in the pump apparatus of the conventional art and to provide a pump assembly capable of downsizing.

The other objects and features of this invention will become understood from the following description with reference to the accompanying drawings.

In one aspect of the present invention, there is provided a pump assembly including:

a housing;

a pump unit accommodated in a pump unit receiving portion which is formed in the housing, the pump unit having a low pressure portion and a high pressure portion therewithin;

a suction passage formed in the housing, through which a working fluid is supplied to the low pressure portion of the pump unit;

a low pressure chamber which is communicated with the suction passage and the low pressure portion; and a discharge passage through which the working fluid pressurized by the pump unit is discharged, wherein when the pump unit is accommodated in the pump unit receiving portion, the low pressure chamber is formed between the pump unit and a wall surface of the housing which defines the pump unit receiving portion, and the discharge passage is formed by a communication pipe which extends through the low pressure chamber and communicates the housing and the high pressure portion of the pump unit with each other.

In a further aspect of the present invention, there is provided a pump assembly including:

a housing;

a generally cylindrical pump unit accommodated in a pump unit receiving portion, the pump unit receiving portion being formed in the housing and cooperating with the housing to define a low pressure chamber;

a suction passage opened to an outer circumferential surface of the pump unit, through which a working fluid is supplied into the pump unit; and a discharge passage through which the working fluid pressurized by the pump unit is discharged to an outside of the housing;

wherein the discharge passage is formed by a communication member which is exposed to the low pressure chamber and allows the pump unit and the housing to communicate with each other.

In a still further aspect of the present invention, there is provided a pump assembly including:

a housing;

a pump unit accommodated in a pump unit receiving portion, the pump unit receiving portion being formed in the housing and cooperating with the housing to define a low pressure chamber, the pump unit having a high pressure portion therewithin; and a discharge passage means extending across the low pressure chamber and communicating the high pressure portion of the pump unit and the housing with each other.

DETAILED DESCRIPTION OF THE INVENTION

A pump assembly according to a first embodiment of the present invention will be explained hereinafter with reference to the accompanying drawings.

[Construction of Brake Hydraulic Circuit]

Figure 1:
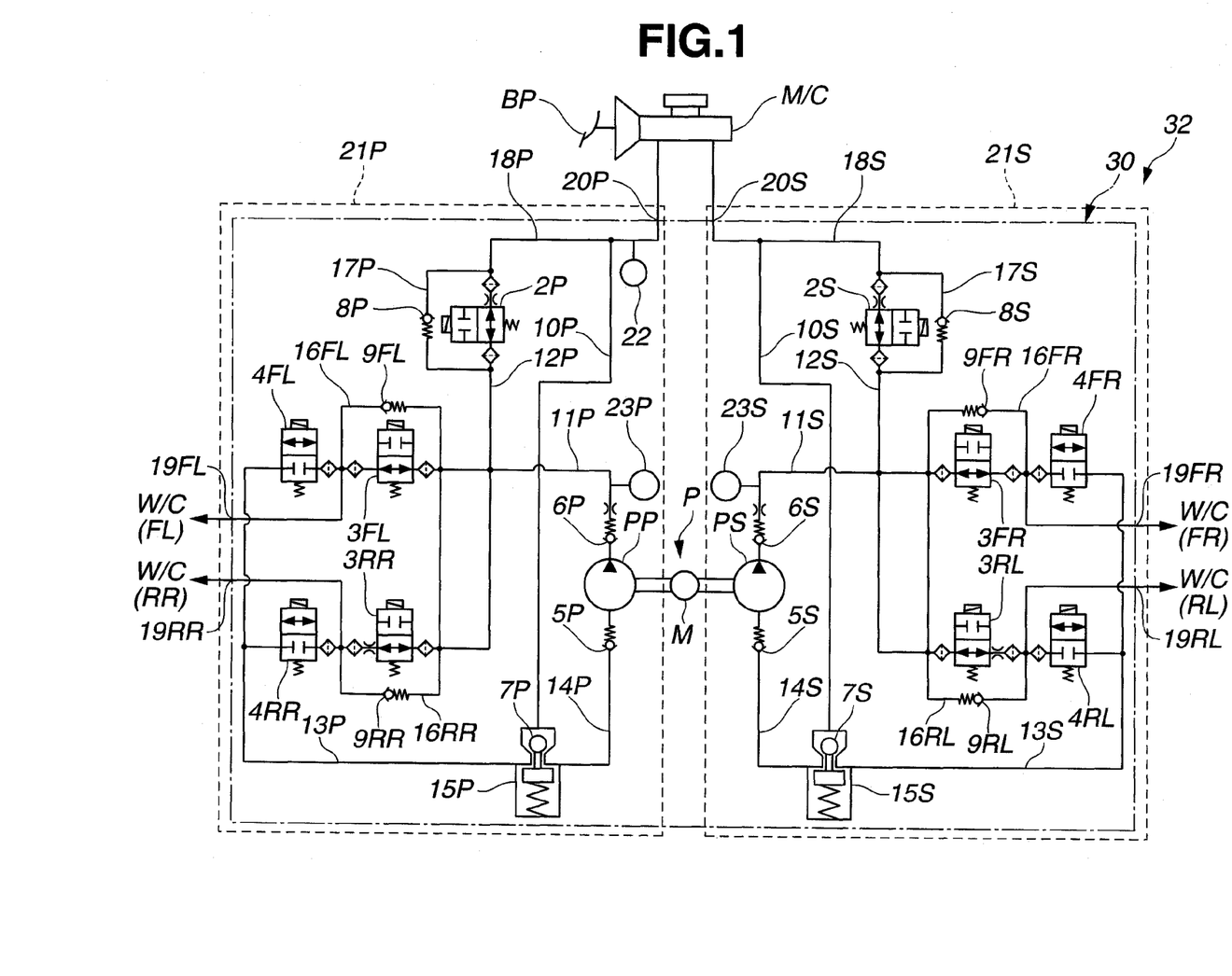
FIG. 1 is a hydraulic circuit diagram of a brake hydraulic control apparatus into which a pump assembly according to a first embodiment of the present invention is applicable.
Figure 2A:
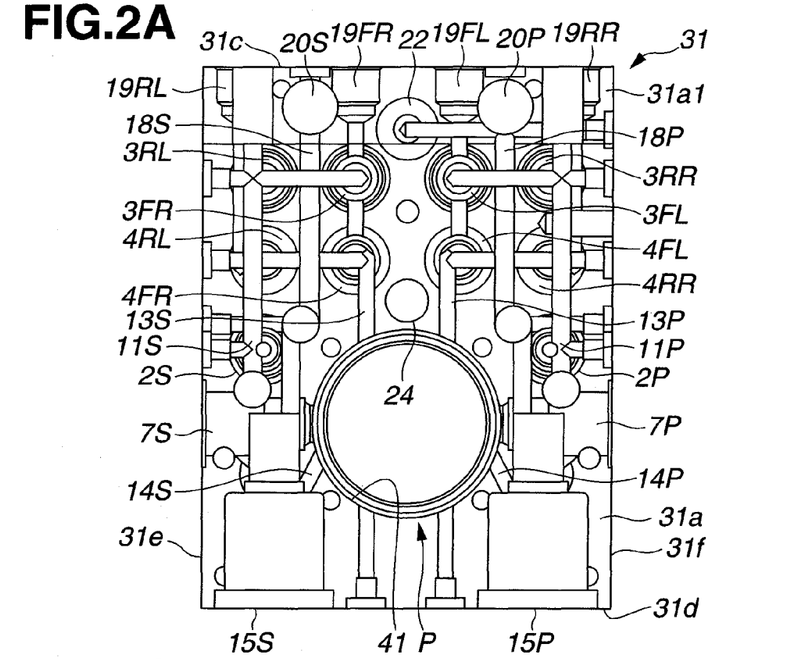
FIGS. 2A-2C are skeleton diagrams illustrating a housing of a fluid pressure control unit in the brake fluid pressure control apparatus, in which a pump unit of the pump assembly according to the first embodiment is accommodated.
Figure 2B:
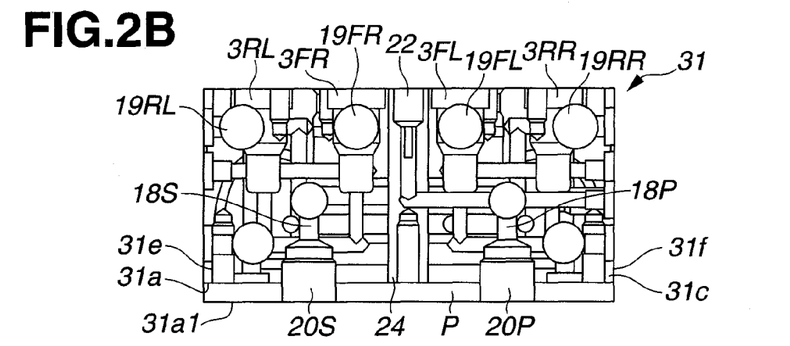
Figure 2C:
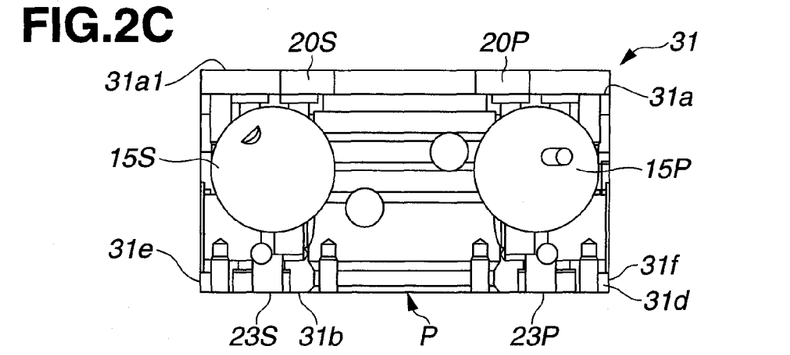
Figure 3A:
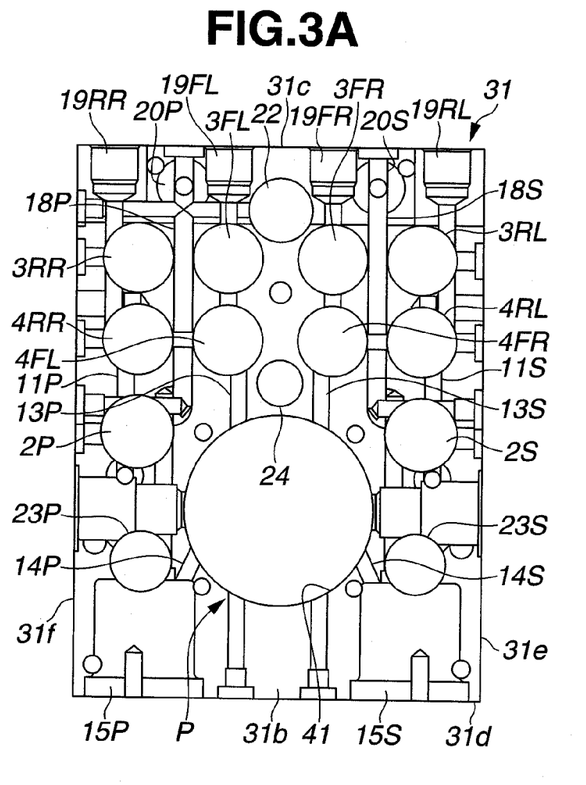
FIGS. 3A-3C are skeleton diagrams illustrating the housing when viewed from directions different from FIGS. 2A-2C.
Figure 3B:
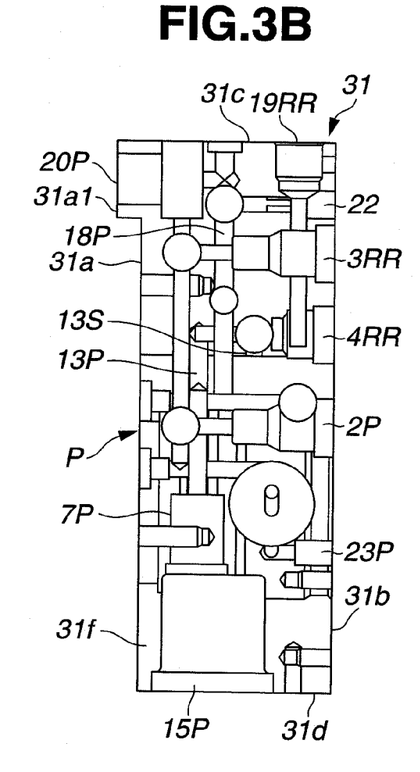
Figure 3C:
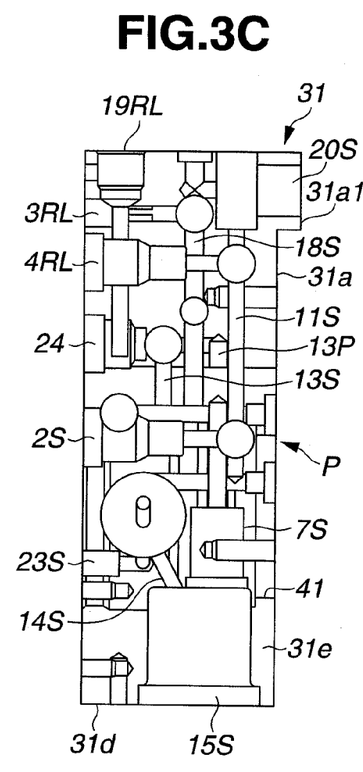

FIG. 1 is a hydraulic circuit diagram of brake fluid pressure control apparatus 32 for a vehicle to which the pump assembly according to the first embodiment is applicable. The hydraulic circuit is formed in hydraulic control unit 30 of brake fluid pressure control apparatus 32 which is disposed between master cylinder M/C and wheel cylinder W/C. FIG. 2 and FIG. 3 are skeleton diagrams respectively showing housing 31 of hydraulic control unit 30. In FIG. 2 and FIG. 3, valves, a control unit and motor M are omitted for the sake of simply illustrating the housing 31.

Brake fluid pressure control apparatus 32 performs fluid pressure control in accordance with a required fluid pressure which is given by Vehicle Dynamics Control (hereinafter referred to as VDC) and Anti-lock Brake System (hereinafter referred to as ABS). Brake fluid pressure control apparatus 32 has a so-called X-piping structure constituted of two brake pipe lines, i.e., line P with brake hydraulic circuit 21P and line S with brake hydraulic circuit 21S. Line P is connected to wheel cylinder W/C(FL) for a left front wheel and wheel cylinder W/C(RR) for a right rear wheel. Line S is connected to wheel cylinder W/C(FR) for a right front wheel and wheel cylinder W/C(RL) for a left rear wheel. Brake fluid pressure control apparatus 32 and respective wheel cylinders W/C are connected to wheel cylinder ports 19 (19RL, 19FR, 19FL, 19RR) which are provided in the form of holes which are opened to upper surface 31c of housing 31 as explained later. Pump unit P is a tandem gear pump including gear pump PP for line P and gear pump PS for line S.

Master cylinder M/C and fluid pressure control unit 30 are connected to each other in fluid passages 18P and 18S through master cylinder ports 20P and 20S which are provided in the form of holes which are opened to port connecting surface 31a1 of housing 31 as explained later. Fluid passages 18P and 18S are connected to a suction side of pump unit P through fluid passages 10P and 10S. Master cylinder pressure sensor 22 is disposed on fluid passage 18P between master cylinder port 20P and a connection portion of fluid passage 18P with fluid passage 10P. Check valves 5P and 5S are disposed on fluid passages 10P and 10S between master cylinder ports 20P and 20S and pump unit P, respectively. Check valves 5P and 5S are operative to allow a flow of brake fluid in a direction from master cylinder ports 20P and 20S toward pump unit P and inhibit a flow of brake fluid in the reverse direction.

A discharge side of pump unit P and respective wheel cylinders W/C(FL), W/C(FR), W/C(RR) and W/C(RL) are connected to each other through fluid passages 11P and 11S. Pressure increasing valves 3FL, 3RR, 3FR and 3RL are provided on fluid passages 11P and 11S. Pressure increasing valves 3FL, 3RR, 3FR and 3RL are normally open solenoid valves and provided corresponding to respective wheel cylinders W/C(FL), W/C(FR), W/C(RR) and W/C(RL). Check valve 6P is disposed on fluid passage 11P between pump unit P and pressure increasing valves 3FL and 3RR. Check valve 6S is disposed on fluid passage 11S between pump unit P and pressure increasing valves 3FR and 3RL. Check valves 6P and 6S are operative to allow a flow of brake fluid in a direction from pump unit P toward respective pressure increasing valves 3FL, 3RR, 3FR and 3RL and inhibit a flow of brake fluid in the reverse direction. Discharge pressure sensor 23P is disposed on fluid passage 11P between pump unit P and pressure increasing valves 3FL and 3RR. Discharge pressure sensor 23S is disposed on fluid passage 11S between pump unit P and pressure increasing valves 3FR and 3RL.

Fluid passage 11P is connected with bypass passages 16FL and 16RR which bypass pressure increasing valves 3FL and 3RR, respectively. Check valves 9FL and 9RR are disposed in bypass passages 16FL and 16RR, respectively. Check valves 9FL and 9RR are operative to allow a flow of brake fluid in a direction from respective wheel cylinders W/C(FL) and W/C(RR) toward pump unit P and inhibit a flow of brake fluid in the reverse direction. Fluid passage 11S is connected with bypass passages 16FE and 16RL which bypass pressure increasing valves 3FR and 3RL, respectively. Check valves 9FR and 9RL are disposed in bypass passages 16FR and 16RL, respectively. Check valves 9FR and 9RL are operative to allow a flow of brake fluid in a direction from respective wheel cylinders W/C(FR) and W/C(RL) toward pump unit P and inhibit a flow of brake fluid in the reverse direction.

Master cylinder M/C and respective fluid passages 11P and 11S are connected to each other through fluid passages 12P and 12S, respectively. Fluid passage 11P and fluid passage 12P are merged with each other at the position between pump unit P and pressure increasing valves 3FL and 3RR. Fluid passage 11S and fluid passage 12S are merged with each other at the position between pump unit P and pressure increasing valves 3FR and 3RL. Gate-out valves 2P and 2S which are normally open solenoid valves are disposed on fluid passages 12P and 12S, respectively. Fluid passage 12P is connected with bypass passage 17P which bypasses gate-out valve 2P. Fluid passage 12S is connected with bypass passage 17S which bypasses gate-out valve 2S. Check valves 8P and 8S are disposed on bypass passages 17P and 17S, respectively. Check valve 8P is operative to allow a flow of brake fluid in a direction from master cylinder M/C toward respective wheel cylinders W/C(FL) and W/C(RR) and inhibit a flow of brake fluid in the reverse direction. Check valve 8S is operative to allow a flow of brake fluid in a direction from master cylinder M/C toward respective wheel cylinders W/C(FR) and W/C(RL) and inhibit a flow of brake fluid in the reverse direction.

Reservoirs 15P and 15S are disposed on the suction side of pump unit P. Reservoirs 15P and 15S and pump unit P are connected to each other through fluid passages 14P and 14S, respectively. Check valves 7P and 7S are disposed between reservoir 15P and pump unit P and between reservoir 15S and pump unit P, respectively.

Respective wheel cylinders W/C(FL) and W/C(RR) and fluid passage 14P are connected to each other through fluid passage 13P. Respective wheel cylinders W/C(FR) and W/C(RL) and fluid passage 14S are connected to each other through fluid passage 13S. Fluid passage 14P and fluid passage 13P are merged with each other at between check valve 7P and reservoir 15P. Fluid passage 14S and fluid passage 13S are merged with each other at the position between check valve 7S and reservoir 15S. Pressure reducing valves 4FL and 4RR which are normally closed solenoid valves are disposed on fluid passage 13P. Pressure reducing valves 4FR and 4RL which are normally closed solenoid valves are disposed on fluid passage 13S.

[Construction of Housing]

In the following description, as shown in FIGS. 2A-2C and FIGS. 3A-3C, the surface of housing 31 to which master cylinder ports 20P and 20S are opened is referred to as front surface 31a, the surface of housing 31 behind front surface 31a is referred to as rear surface 31b, the surface of housing 31 to which wheel cylinder port 19 is opened is referred to as upper side surface 31c, the surface of housing 31 behind top surface 31c is referred to as underside surface 31d, the surface of housing 31 on the left side of front surface 31a is referred to as left side surface 31e, and the surface of housing 31 on the right side of front surface 31a is referred to as right side surface 31f. FIG. 2A is a diagram showing housing 31 when viewed from front surface 31a. FIG. 2B is a diagram showing housing 31 when viewed from upper side surface 31c. FIG. 2C is a diagram showing housing 31 when viewed from underside surface 31d. FIG. 3A is a diagram showing housing 31 when viewed from rear surface 31b. FIG. 3B is a diagram showing housing 31 when viewed from right side surface 31f. FIG. 3C is a diagram showing housing 31 when viewed from left side surface 31e.

Figure 4:
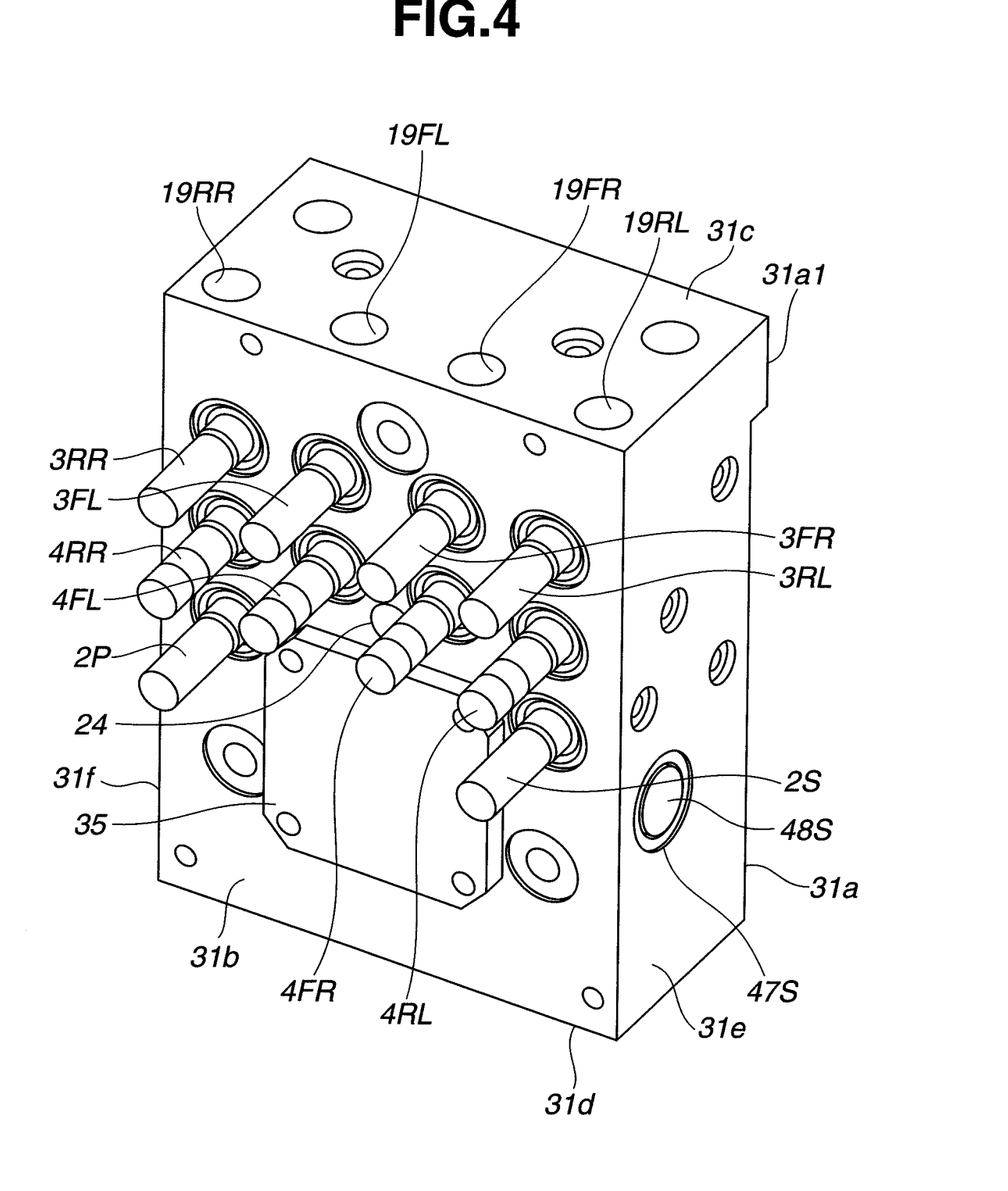
FIG. 4 is a perspective view of the housing as shown in FIGS. 2A-2C and 3A-3C.
Figure 5:
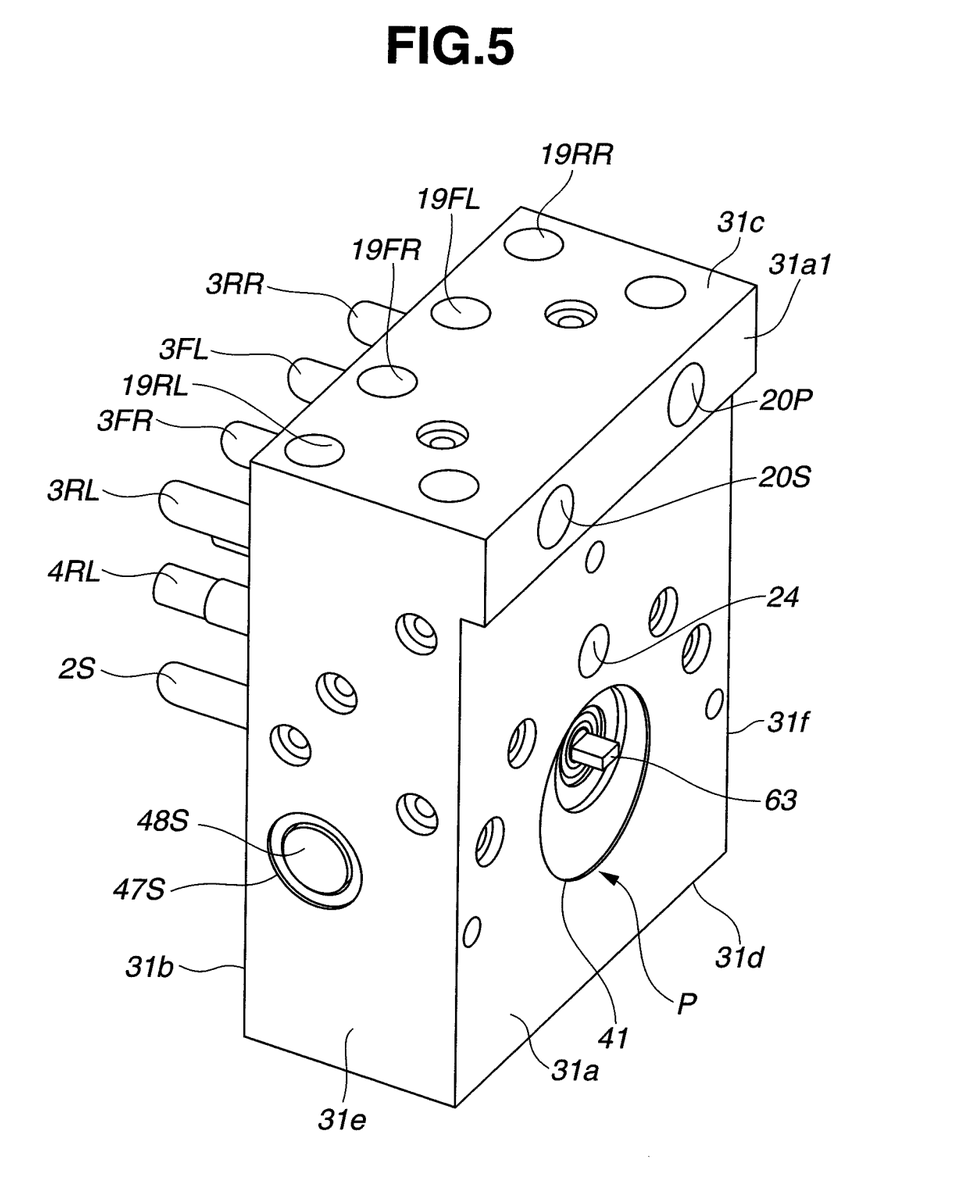
FIG. 5 is a perspective view of the housing when viewed from a direction different from FIG. 4.
Figure 6:
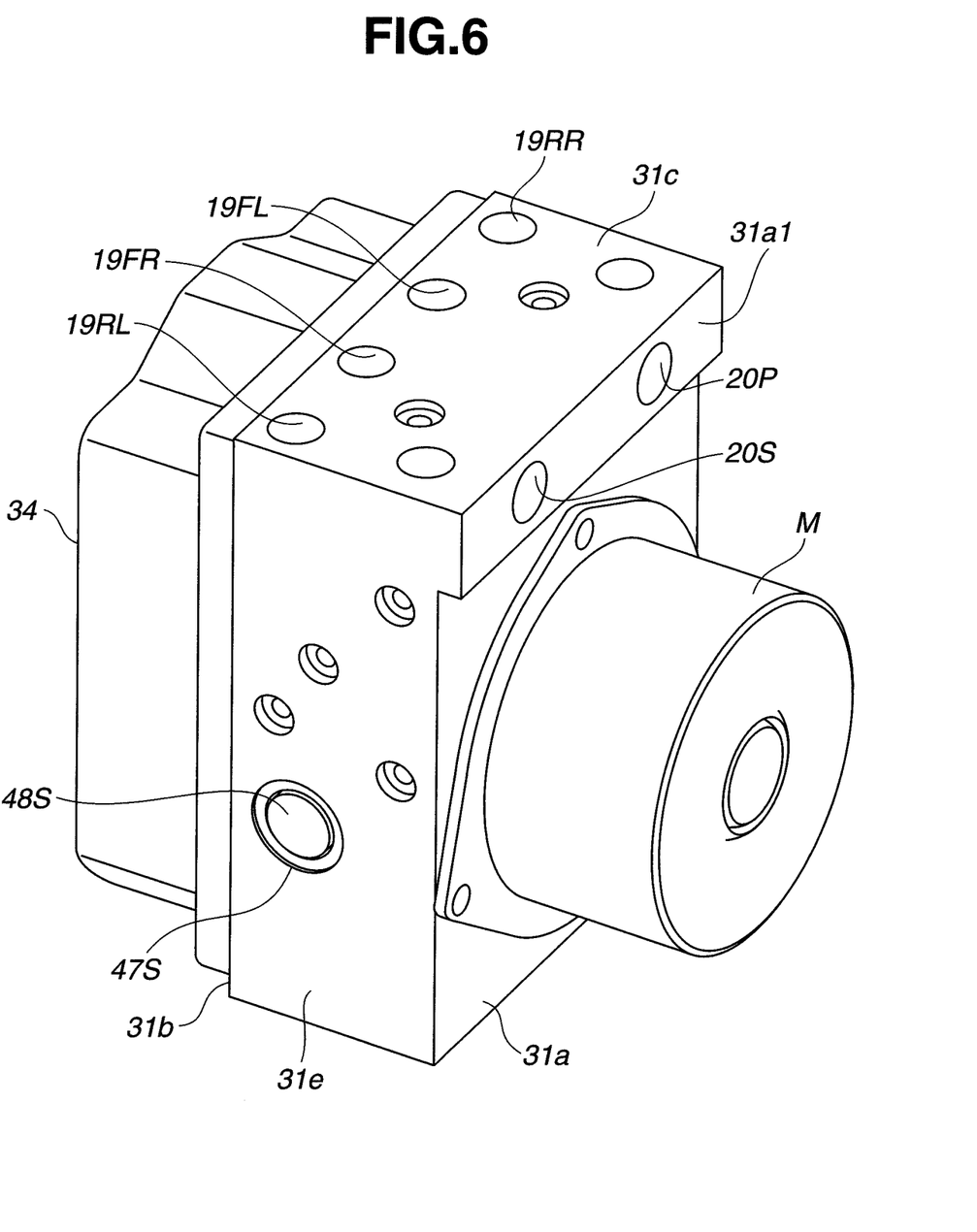
FIG. 6 is a perspective view of the housing when viewed from a direction different from FIG. 4 and FIG. 5.

FIG. 4, FIG. 5 and FIG. 6 are perspective views of housing 31. FIG. 4 shows rear surface 31b, upper side surface 31c and left side surface 31e. FIG. 5 shows front surface 31a, upper side surface 31c and left side surface 31e. FIG. 6 shows housing 31 to which unit case 34 and motor M are assembled.

Housing 31 has a generally rectangular solid shape. Motor M is mounted to front surface 31a as shown in FIG. 6. Mounted to rear surface 31b are the solenoid valves, i.e., gate-out valves 2P and 2S, pressure increasing valves 3FL, 3RR, 3FR and 3RL, pressure reducing valves 4FL, 4RR, 4FR and 4RL, and an electric unit for driving these solenoid valves. The electric unit includes a substrate for circuits performing predetermined computation on the basis of an input signal from a sensor such as a wheel speed sensor mounted to the vehicle. The electric unit outputs a predetermined electric signal to motor M and solenoids disposed in the solenoid valves. The electric unit is accommodated in unit case 34 shown in FIG. 6. Housing 31 is formed with power source hole 24 which extends from front surface 31a and rear surface 31b through housing 31. The electric unit and motor M are connected to each other by inserting electrodes of motor M into power source hole 24.

Housing 31 has valve mounting holes into which the solenoid valves are mounted by press-fitting or caulking, a plurality of fluid passages which extend between the solenoid valves and ports and connect them to each other. Further, housing 31 has holes which serve for providing the ports (i.e., wheel cylinder ports 19FL, 19RR, 19FR, 19RL and master cylinder ports 20P, 20S) to be connected to the cylinders (i.e., wheel cylinder W/C and master cylinder M/C) and reservoirs 15P 15S. These holes and fluid passages are formed by drilling the respective surfaces of housing 31 from the outside.

Housing 31 has port connecting surface 31a1 on the side of upper surface 31c which has a normal face on the side of motor M and extends substantially parallel with front surface 31a. Specifically, port connecting surface 31a1 is formed on a projection of housing 31 which extends from an upper side of front surface 31a toward the front side of front surface 31a (i.e., toward the side of motor M in a direction of drive shaft 63 shown in FIG. 5). Master cylinder ports 20P and 20S are formed on port connecting surface 31a1.

Further, housing 31 has a generally cylindrical pump unit receiving portion 41 in which pump unit P is accommodated. Pump unit receiving portion 41 is in the form of a through hole extending from front surface 31a to rear surface 31b through housing 31. An opening of pump unit receiving portion 41 which is opened to rear surface 31b is closed by pump cover 35. Housing 31 has discharge portion receiving holes 47P and 47S in which discharge portions 48P and 48S to be connected to the discharge side of pump unit P is accommodated. Discharge portion receiving hole 47 extends from left side surface 31e to right side surface 31f in a direction substantially perpendicular to pump unit receiving portion 41.

[Construction of Pump Unit]

Figure 7:
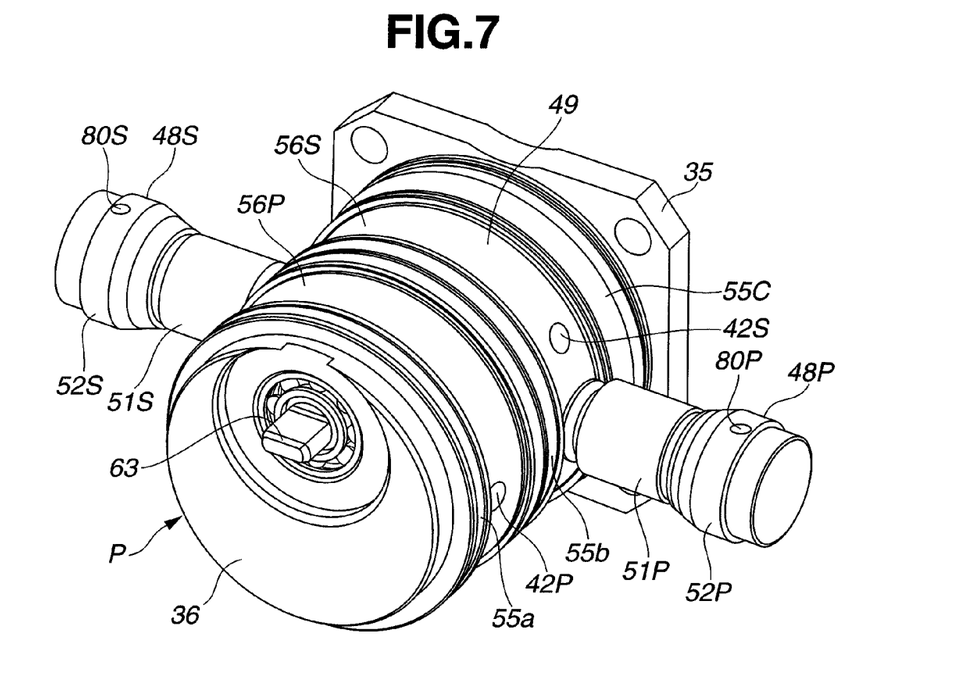
FIG. 7 is a perspective view showing a pump unit and a discharge portion of the pump assembly according to the first embodiment.
Figure 8:
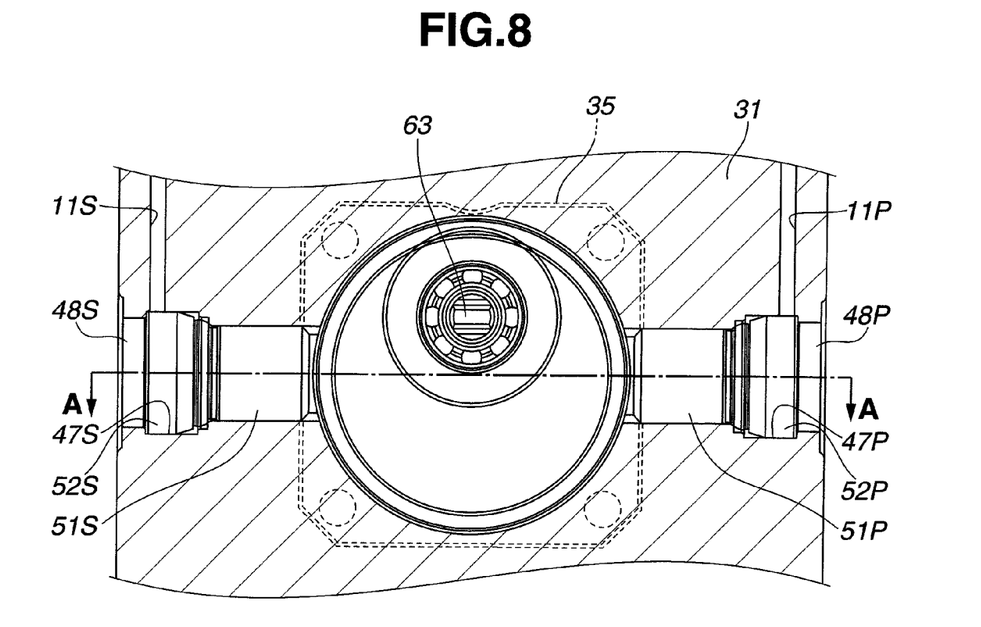
FIG. 8 is a partially sectional view showing the pump unit and the discharge portion of the pump assembly according to the first embodiment which are accommodated in the housing.
Figure 9:
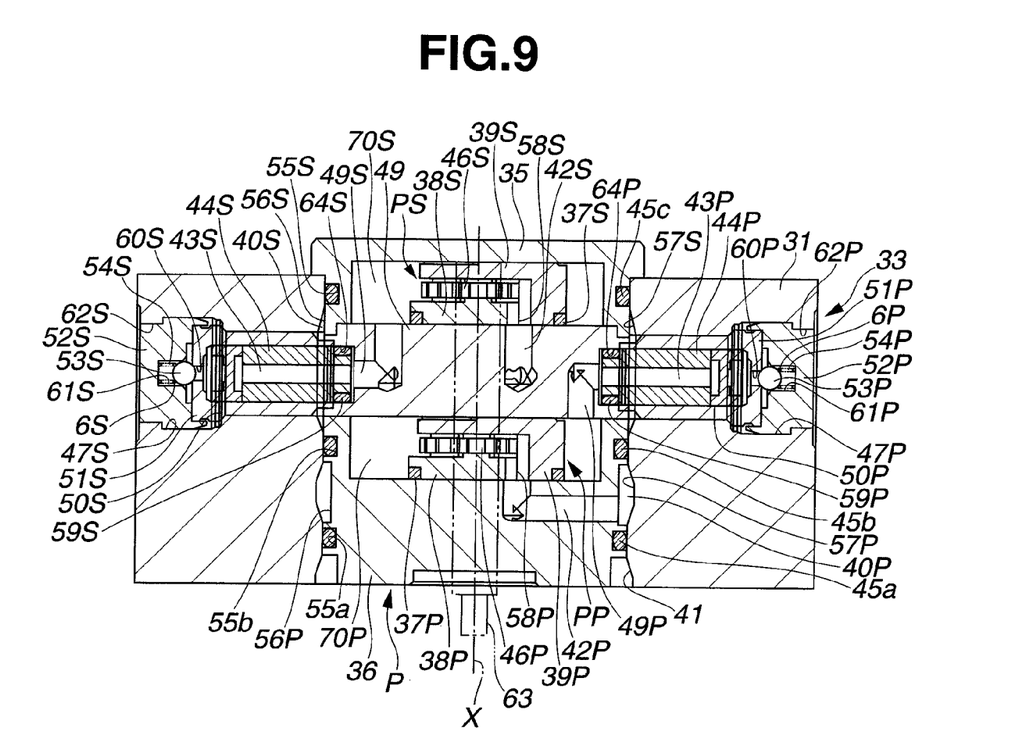
FIG. 9 is a sectional view taken along line A-A in FIG. 8.

FIG. 7 is a perspective view of pump unit P and discharge portions 48P and 48S. FIG. 8 is a partially sectional view showing pump unit P and discharge portions 48P and 48S which are accommodated in housing 31. FIG. 9 is a sectional view taken along line A-A shown in FIG. 8.

Pump unit P includes pump housing 36, center plate 49 and pump cover 35 which are formed into a generally cylindrical shape in outer appearance thereof when assembled together. Pump housing 36, center plate 49 and pump cover 35 are assembled with each other in order in an axial direction of pump unit P. Pump housing 36 includes a hollowed portion having a closed end. The hollowed portion of pump housing 36 and center plate 49 cooperate with each other to define a space therebetween in which gear pump PP is accommodated. Pump cover 35 also includes a hollowed portion having a closed end. The hollowed portion of pump cover 35 and center plate 49 cooperate with each other to define a space therebetween in which gear pump PS is accommodated. O-ring grooves 55a and 55b are formed on an outer circumferential surface of pump housing 36. O-ring groove 55c is formed on an outer circumferential surface of pump cover 35. These O-ring grooves 55a, 55b and 55c are spaced apart from each other in the axial direction of pump unit P. O-rings 45a, 45b and 45c are fitted into O-ring grooves 55a, 55b and 55c, respectively.

Low pressure chamber groove 56P is formed on an outer circumferential surface of pump housing 36 between O-ring 45a and O-ring 45b. Low pressure chamber groove 57P is formed on an inner circumferential surface of pump unit receiving portion 41 so as to be opposed to low pressure chamber groove 56P when pump unit P is received in pump unit receiving portion 41 of housing 31. Low pressure chamber 40P of gear pump PP is defined by low pressure chamber groove 56P of pump housing 36, low pressure chamber groove 57P of pump unit receiving portion 41, O-ring 45a and O-ring 45b. That is, low pressure chamber 40P of gear pump PP is an annular space formed between an outer circumferential wall surface of pump unit P and a wall surface of housing 31 which defines pump unit receiving portion 41.

Center plate 49 has low pressure chamber groove 56S on an outer circumferential surface thereof. Low pressure chamber groove 57S is formed on an inner circumferential surface of pump unit receiving portion 41 so as to be opposed to low pressure chamber groove 56S when pump unit P is received in pump unit receiving portion 41 of housing 31. Low pressure chamber 40S of gear pump PS is defined by low pressure chamber groove 56S of center plate 49, low pressure chamber groove 57S of pump unit receiving portion 41, O-ring 45b and O-ring 45c. That is, low pressure chamber 40S of gear pump PS is an annular space formed between an outer circumferential wall surface of pump unit P and the wall surface of housing 31 which defines pump unit receiving portion 41.

Gear pump PP includes first gear plate 38P, second gear plate 39P and a pair of drive and driven external gears 46P. Suction portion 58P is formed between first gear plate 38P and second gear plate 39P. O-ring 37P is located on the open side of suction portion 58P which is connected with suction passage 42P. Specifically, O-ring 37P is disposed on an outer circumferential surface of a portion of gear pump PP which is contacted with pump housing 36. Similarly, gear pump PS includes first gear plate 38S, second gear plate 39S and a pair of drive and driven external gears 46S. Suction portion 58S is formed between first gear plate 38S and second gear plate 39S. O-ring 37S is disposed on the open side of suction portion 58S, that is, on an outer circumferential surface of a portion of gear pump PS which is contacted with center plate 49.

Gears 46P and 46S are connected on their drive side to drive shaft 63. Drive shaft 63 extends through first gear plates 38P and 38S and second gear plates 39P and 39S of gear pumps PP and PS, center plate 49 and pump housing 36 and then is connected to a rotating shaft of motor M.

High pressure chamber 70P of gear pump PP is formed by a space defined by pump housing 36, center plate 49, first gear plate 38P and second gear plate 39P of gear pump PP. High pressure chamber 70S of gear pump PS is formed by a space defined by pump cover 35, center plate 49, first gear plate 38S and second gear plate 39S of gear pump PS.

Pump housing 36 is formed with suction passage 42P which communicates suction portion 58P and low pressure chamber 40P of gear pump PP with each other. On the other hand, center plate 49 is formed with suction passage 42S which communicates suction portion 58S and low pressure chamber 40S of gear pump PS with each other.

Discharge portions 48P and 48S include discharge passages 43P and 43S and one-way valves 6P and 6S, respectively. Discharge portions 48P and 48S are accommodated in discharge portion receiving holes 47P and 47S, respectively, of housing 31. Discharge portion receiving holes 47P and 47S are configured to extend between left side surface 31e and right side surface 31f of housing 31 in the direction substantially perpendicular to pump unit receiving portion 41. In other words, discharge portion receiving holes 47P and 47S are formed along a radial direction of respective low pressure chambers 40P and 40S so as to be symmetric with respect to axis X of pump unit P.

Discharge passages 43P and 43S are respectively formed by communication members 44P and 44S each having a through hole in an axial direction thereof. Communication member 44P has one end portion inserted together with O-ring 59P into insertion hole 64P which is formed in an outer circumferential surface of center plate 49. Communication member 44S has one end portion inserted together with O-ring 59S into insertion hole 64S which is formed in the outer circumferential surface of center plate 49. In the state that the one end portions of communication members 44P and 44S are inserted into insertion holes 64P and 64S, respectively, communication members 44P and 44S extend through low pressure chambers 40P and 40S, respectively. Center plate 49 is formed with communication passage 49P which establishes fluid communication between an opening at the one end portion of communication member 44P and high pressure chamber 70P. Center plate 49 is also formed with communication passage 49S which establishes fluid communication between an opening at the one end portion of communication member 44S and high pressure chamber 70S. Filter 50P is disposed in an opening at the other end portion of communication member 44P. Filter 50S is disposed in an opening at the other end portion of communication member 44S.

One-way valve 6P is constituted of generally cylindrical seat member 51P, ball 53P, spring 54P and retainer 52P. One-way valve 6S is constituted of generally cylindrical seat member 51S, ball 53S, spring 54S and retainer 52S. Seat member 51P has a hollowed portion in which communication member 44P and filter 50P are disposed. Similarly, seat member 51S has a hollowed portion in which communication member 44S and filter 50S are disposed. Seat members 51P and 51S have through holes 60P and 60S at bottoms of the hollowed portions, respectively. Through holes 60P and 60S communicate the hollowed portions with an outside of seat members 51P and 51S, respectively. Retainers 52P and 52S are formed with spring holes 61P and 61S, respectively, which are larger in diameter than balls 53P and 53S. Spring holes 61P and 61S are respectively communicated with fluid passages 11P and 11S of housing 31 through communication holes 80P and 80S which are formed in retainers 52P and 52S. Upon assembling, spring 54P and ball 53P are inserted into spring hole 61P and then retainer 52P is inserted into discharge portion receiving hole 47P such that ball 53P is seated on one end of through hole 60P of seat member 51P. Then, retainer 52P is fixed to discharge portion receiving hole 47P by caulking so that retainer 52P is held in the fixed state at caulking portion 62P. Similarly, spring 54S and ball 53S are inserted into spring hole 61S and then retainer 52S is inserted into discharge portion receiving hole 47S such that ball 53S is seated on one end of through hole 60S of seat member 51S. Then, retainer 52S is fixed to discharge portion receiving hole 47S by caulking so that retainer 52S is held in the fixed state at caulking portion 62S.

[Functions]

Since the conventional pump apparatus includes low pressure chambers and high pressure chambers which are arranged along the axial direction of the pump apparatus, an axial length of the pump apparatus is increased to thereby cause a problem of upsizing the pump apparatus. Further, in the conventional pump apparatus, it is necessary to sandwich the high pressure chambers between the low pressure chambers so as to prevent leakage of the fluid from the high pressure chambers to an outside of the pump apparatus.

In order to solve the above problem, pump assembly 33 according to the first embodiment includes discharge passage 43 formed by communication member 44 which is exposed to low pressure chamber 40 and communicates pump unit P and housing 31 with each other.

Figure 10:
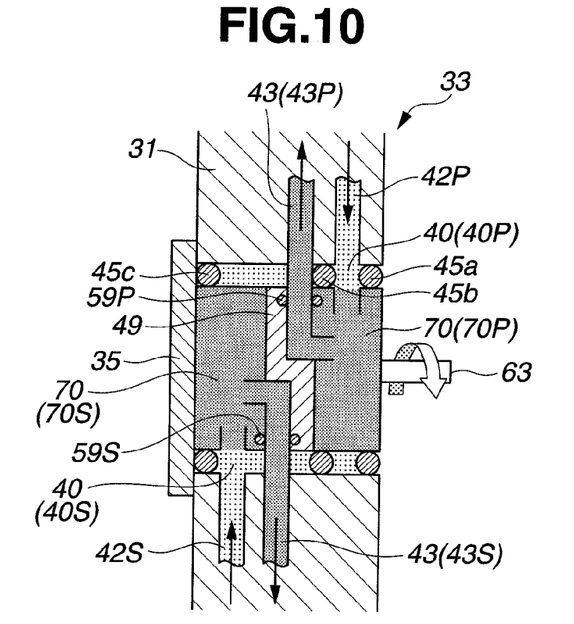
FIG. 10 is a schematic diagram illustrating the pump assembly according to the first embodiment.

FIG. 10 is a schematic diagram of pump assembly 33. In FIG. 10, a thick dotted portion denotes a high pressure portion of pump assembly 33 and a thin dotted portion denotes a low pressure portion of pump assembly 33. As shown in FIG. 10, pump assembly 33 is constructed such that discharge passage 43 is exposed to low pressure chamber 40. In addition, the low pressure portion (low pressure chamber 40) can be formed on the outer circumferential side of the high pressure portion (high pressure chamber 70) within pump assembly 33. As a result, the low pressure portion and the high pressure portion can be arranged to overlap with each other with respect to the axial direction of pump unit P. Accordingly, an axial length of pump unit P can be reduced to thereby attain downsizing of pump assembly 33.

Further, the low pressure portion (low pressure chamber 40) can be formed between pump unit P and housing 31. In other words, it is possible to form the high pressure portion so as not to be placed between pump unit P and housing 31. Since seal members which seal the low pressure portion more readily ensure a sealability as compared to seal members which seal the high pressure portion, the seal members which seal the low pressure portion do not require a large allowance. This results in reducing a force to be applied to pump unit P upon inserting pump unit P into housing 31. Thus, pump assembly 33 can be enhanced in assembling performance.

Furthermore, even when there occurs leakage of the working fluid from the high pressure portion, the leaked working fluid merely flows into the low pressure portion (low pressure chamber 40) disposed on the outer circumferential side of the high pressure portion. Therefore, the working fluid leaked from the high pressure portion can be allowed to remain in the hydraulic circuit.

In addition, since the high pressure portion is not contacted with housing 31, backlash of pump unit P relative to housing 31 can be suppressed. Accordingly, a fastening force to fix pump unit P to housing 31 can be reduced.

Further, in pump assembly 33 according to the first embodiment, pump unit P is a tandem gear pump including two gear pumps which are coaxially coupled to each other. Therefore, two pumps can be disposed within a single pump unit P, thereby serving for downsizing of pump unit P.

Furthermore, in pump assembly 33 according to the first embodiment, low pressure chamber 40 is divided into first low pressure chamber 40P corresponding to gear pump PP and second low pressure chamber 40S corresponding to gear pump PS only by O-rings 45a, 45b and 45c, and communication members 44 (44P, 44S) are disposed in one of first low pressure chamber 40P and second low pressure chamber 40S. Therefore, it is possible to collectively arrange both of communication members 44 (44P, 44S) only on the side of one of first and second low pressure chambers 40P and 44S, and therefore, simplify the construction of pump assembly 33.

Further, pump assembly 33 according to the first embodiment includes pump unit receiving portion 41 formed into a generally cylindrical recessed portion, center plate 49 disposed between gear pumps PP and PS, communication members 44 (44P, 44S) which allow the high pressure portions (high pressure chambers 70P, 70S) of gear pumps PP and PS to communicate with housing 31 through center plate 49, respectively, and low pressure chambers 40 (40P, 40S) disposed between pump unit P and a circumferential wall of the generally cylindrical recessed portion (i.e., pump unit receiving portion 41). Communication members 44 are arranged along the radial direction of low pressure chambers 40 so as to be symmetric with respect to axis X of pump unit P.

With this arrangement, communication members 44 can be placed in a position where a piston of a plunger pump is disposed, so that a production cost of housing 31 can be reduced.

In addition, pump assembly 33 according to the first embodiment includes one-way valve 6 (6P, 6S) built in each of communication members 44 (44P, 44S) such that the working fluid pressurized by pump unit P is allowed to flow only in a direction of discharge from pump unit P.

Accordingly, it is not necessary to separately provide a space within pump assembly 33 in which each of one-way valves is installed. Therefore, downsizing of pump assembly 33 can be attained.

[Effects]

Pump assembly 33 according to the first embodiment attains the following effects.

(1) Pump assembly 33 includes housing 31 and generally cylindrical pump unit P accommodated in pump unit receiving portion 41 which is formed in housing 31 and cooperates with housing 31 to define low pressure chamber 40. Pump assembly 33 further includes suction passage 42 opened to an outer circumferential surface of pump unit P, through which working fluid is supplied into pump unit P, and discharge passage 43 through which the working fluid pressurized by pump unit P is discharged to an outside of housing 31. Discharge passage 43 is formed by communication member 44 which is exposed to low pressure chamber 40 and allows pump unit P and housing 31 to communicate with each other.

Since discharge passage 43 is exposed to low pressure chamber 40, the low pressure portion (low pressure chamber 40) can be formed on an outer circumferential side of the high pressure portion (high pressure chamber 70) so that the low pressure portion and the high pressure portion can be arranged to overlap with each other with respect to the axial direction of pump unit P. With this arrangement, an axial length of pump unit P can be reduced to thereby attain downsizing of pump assembly 33.

Further, the low pressure portion (low pressure chamber 40) is formed between pump unit P and housing 31. In other words, the high pressure portion can be formed so as not to be placed between pump unit P and housing 31. Since seal members which seal the low pressure portion more readily ensure a sealability as compared to seal members which seal the high pressure portion, the seal members which seal the low pressure portion do not require a large allowance to thereby reduce a force to be applied to pump unit P upon inserting pump unit P into housing 31. As a result, pump assembly 33 can be enhanced in assembling performance.

Further, discharge passage 43 which is a part of the high pressure portion is exposed to low pressure chamber 40. With this arrangement, even when there occurs leakage of the working fluid from the high pressure portion, the working fluid thus leaked out of the high pressure portion can be allowed to remain in the hydraulic circuit.

Further, since the high pressure portion is not contacted with housing 31, backlash of pump unit P relative to housing 31 can be suppressed. Accordingly, a fastening force to fix pump unit P to housing 31 can be reduced.

(2) Pump unit P is provided in the form of a tandem gear pump having two gear pumps which are coaxially coupled to each other.

With this construction, two pumps can be disposed within a single pump unit P, thereby serving for downsizing of pump unit P.

(3) Low pressure chamber 40 is divided into first low pressure chamber 40P corresponding to gear pump PP and second low pressure chamber 40S corresponding to gear pump PS by O-rings 45a, 45b and 45c, and communication members 44 (44P, 44S) are disposed in one of first low pressure chamber 40P and second low pressure chamber 40S.

With this construction, it is possible t collectively arrange both of communication members 44 (44P, 44S) on the side of one of first and second low pressure chambers 40P and 44S, and therefore, simplify the construction of pump assembly 33.

(4) Pump unit receiving portion 41 is formed into a generally cylindrical recessed portion. Pump unit P includes center plate 49 disposed between gear pumps PP and PS. Communication members 44P, 44S allow the high pressure portions (high pressure chambers 70P, 70S) of gear pumps PP, PS to communicate with housing 31 through center plate 49. Low pressure chambers 40P, 40S are disposed between pump unit P and a circumferential wall surface of the generally cylindrical recessed portion. Communication members 44P, 44S are arranged along the radial direction of low pressure chambers 40P, 40S so as to be symmetric with respect to axis X of pump unit P.

With this construction, communication members 44P, 44S can be placed in a position where a piston of a plunger pump is disposed, so that a production cost of housing 31 can be reduced.

(5) One-way valve 6 which allows the working fluid pressurized by pump unit P to flow only in a direction of discharge from pump unit P is built in each of communication members 44.

With this construction, it is not necessary to separately provide a space within pump assembly 33 in which one-way valve 6 is installed. Therefore, downsizing of pump assembly 33 can be attained.

(6) Low pressure chamber 40 is an annular space formed between an outer circumferential wall surface of pump unit P and the wall surface of housing 31 which defines pump unit receiving portion 41. Communication member 44 is disposed along a radial direction of the annular space.

With this construction, communication member 44 can be placed in a position where a piston of a plunger pump is disposed, so that a production cost of housing 31 can be reduced.

OTHER EMBODIMENTS

The present invention is not limited to the above-described first embodiment. Although in the first embodiment, the O-rings are used for isolating the low pressure portion and the high pressure portion from each other, the low pressure portion and the high pressure portion can be isolated by press-fitting or caulking.

In addition, the tandem gear pump used in the first embodiment can be replaced by a single gear pump.

Further, external gear pumps PP and PS using external gears 46P and 46S can be replaced by trochoidal gear pumps using internal gears.

Further, although in the first embodiment, communication members 44P and 44S extend through one of low pressure chambers, i.e., second low pressure chamber 40S, communication member 44P can be allowed to extend through first low pressure chamber 40P and communication member 44S can be allowed to extend through second low pressure chamber 40S.

Furthermore, other technical concepts and effects of the present invention which are understandable from the above embodiments are described as follows.

In a first aspect of the present invention, there is provided a pump assembly including:

a housing;

a pump unit accommodated in a pump unit receiving portion which is formed in the housing, the pump unit having a low pressure portion and a high pressure portion therewithin;

a suction passage formed in the housing, through which a working fluid is supplied to the low pressure portion of the pump unit;

a low pressure chamber which is communicated with the suction passage and the low pressure portion; and a discharge passage through which the working fluid pressurized by the pump unit is discharged, wherein when the pump unit is accommodated in the pump unit receiving portion, the low pressure chamber is formed between the pump unit and a wall surface of the housing which defines the pump unit receiving portion, and the discharge passage is formed by a communication pipe which extends through the low pressure chamber and communicates the housing and the high pressure portion of the pump unit with each other.

With this construction, the low pressure portion (low pressure chamber) can be formed on an outer circumferential side of the high pressure portion within the pump assembly. As a result, the low pressure portion and the high pressure portion can be arranged to overlap with each other with respect to the axial direction of the pump unit. Accordingly, an axial length of the pump unit can be reduced, thereby attaining downsizing of the pump assembly.

Further, the low pressure portion (low pressure chamber) can be formed between the pump unit and the housing. In other words, it is possible to form the high pressure portion so as not to be placed between the pump unit and the housing. Since seal members which seal the low pressure portion more readily ensure a sealability as compared to seal members which seal the high pressure portion, the seal members which seal the low pressure portion do not require a large allowance to thereby reduce a force to be applied to the pump unit upon inserting the pump unit into the housing. As a result, the pump assembly can be enhanced in assembling performance.

Further, even when there occurs leakage of the working fluid from the high pressure portion, the working fluid can be allowed to remain in the hydraulic circuit.

Further, since the high pressure portion is not contacted with the housing, backlash of the pump unit relative to the housing can be suppressed. Accordingly, a fastening force to fix the pump unit to the housing can be reduced.

In a second aspect of the present invention, there is provided the pump assembly according to the first aspect, wherein the pump unit is formed into a generally cylindrical shape, the low pressure chamber is an annular space formed between an outer circumferential wall surface of the pump unit and the wall surface of the housing which defines the pump unit receiving portion, and the communication pipe is disposed along a radial direction of the annular space.

With this construction, the communication pipe can be placed in a position where a piston of a plunger pump is disposed, so that a production cost of the housing can be reduced.

In a third aspect of the present invention, there is provided the pump assembly according to the first aspect, wherein a one-way valve is disposed in the discharge passage, the one-way valve allowing the working fluid pressurized by the pump unit to flow only in a direction of discharge from the pump unit.

With this construction, it is not necessary to separately provide a space within the pump assembly in which the one-way valve is installed. Therefore, downsizing of the pump assembly can be attained.

In a fourth aspect of the present invention, there is provided the pump assembly according to the first aspect, wherein the pump unit is a tandem gear pump including two gear pumps, the pump unit including a drive shaft which drives drive gears of the gear pumps, wherein the gear pumps are arranged along an axial direction of the drive shaft.

With this construction, two pumps can be disposed within a single pump unit, thereby serving for downsizing of the pump unit.

In a fifth aspect of the present invention, there is provided the pump assembly according to the fourth aspect, wherein the tandem gear pump includes two gear pumps coaxially coupled to each other, the low pressure chamber is divided into a first low pressure chamber corresponding to one of the two gear pumps and a second low pressure chamber corresponding to the other of the two gear pumps by O-rings, and the communication pipe is disposed in each of the first and second low pressure chambers.

With this construction, it is possible to allow the first and second low pressure chambers to have a substantially equal volume and therefore equalize suction capacity of the two gear pumps.

In a sixth aspect of the present invention, there is provided the pump assembly according to the fifth aspect, wherein the pump unit is formed into a generally cylindrical shape, the low pressure chamber is an annular space formed between an outer circumferential wall surface of the pump unit and the wall surface of the housing which defines the pump unit receiving portion, and the communication pipes are disposed along a radial direction of the annular space.

Since the low pressure portion (low pressure chamber) is formed between the pump unit and the housing, the seal members which seal the low pressure portion do not require a large allowance to thereby reduce a force to be applied to the pump unit upon inserting the pump unit into the housing. As a result, the pump assembly can be enhanced in assembling performance.

Further, a volume of the respective communication pipes extending through the low pressure chambers can be reduced. Therefore, it is possible to ensure the volumes of the low pressure chambers, thereby serving for increasing a suction capacity of the gear pumps.

In a seventh aspect of the present invention, there is provided the pump assembly according to the fourth aspect, wherein the pump unit further includes a center plate disposed between the gear pumps, and the communication pipes which allow the high pressure portions in each of the gear pumps to communicate with the housing through the center plate.

With this construction, since the communication pipes can be connected to the center plate, it is possible to readily fix the communication pipes to the center plate and ensure a sealability of the communication pipes.

Further, a fluid passage is formed in the center plate so as to extend between each of the communication pipes and the discharge side of each of the gear pumps. With this construction, it is possible to readily obtain an access route between each of the communication pipe and the discharge side of each of the gear pumps.

In an eighth aspect of the present invention, there is provided the pump assembly according to the seventh aspect, wherein the pump unit is formed into a generally cylindrical shape, the low pressure chamber is an annular space formed between an outer circumferential wall surface of the pump unit and the wall surface of the housing which defines the pump unit receiving portion, and the communication pipes are disposed along a radial direction of the annular space so as to be symmetric with respect to an axis of the pump unit.

With this construction, the communication pipes can be placed in a position where a piston of a plunger pump is disposed, so that a production cost of the housing can be reduced.

In a ninth aspect of the present invention, there is provided the pump assembly according to the eighth aspect, wherein the low pressure chamber is divided into a first low pressure chamber corresponding to one of the two gear pumps and a second low pressure chamber corresponding to the other of the two gear pumps by O-rings, and the communication pipe corresponding to each of the two gear pumps is disposed in one of the first low pressure chamber and the second low pressure chamber.

With this construction, it is possible to collectively arrange both of the communication pipes on the side of one of the first and second low pressure chambers, and therefore, simplify the construction of the pump assembly.

In a tenth aspect of the present invention, there is provided the pump assembly according to the ninth aspect, wherein the pump assembly is used in a brake control apparatus, in which one of the gear pumps acts to increase a wheel cylinder pressure through a brake hydraulic circuit of a first brake pipe line and the other of the gear pumps acts to increase a wheel cylinder pressure through a brake hydraulic circuit of a second brake pipe line independent of the first brake pipe line.

With this construction, even when a problem such as crack occurs in one of the brake pipe lines, it is possible to increase the wheel cylinder pressure through the brake hydraulic circuit of the other of the brake pipe lines and thereby ensure the braking force.

In an eleventh aspect of the present invention, there is provided the pump assembly according to the eighth aspect, wherein a one-way valve is built in the communication pipe, the one-way valve allowing the working fluid pressurized by the pump unit to flow only in a direction of discharge from the pump unit.

With this construction, it is not necessary to separately provide a space within the pump assembly in which the one-way valve is installed. Therefore, downsizing of the pump assembly can be attained.

In a twelfth aspect of the present invention, there is provided the pump assembly according to the fourth aspect, wherein the low pressure chamber is divided into a first low pressure chamber corresponding to one of the two gear pumps and a second low pressure chamber corresponding to the other of the two gear pumps by O-rings, and the communication pipe corresponding to each of the two gear pumps is disposed in one of the first low pressure chamber and the second low pressure chamber.

With this construction, it is possible to correctively arrange both of the communication pipes on the side of one of the first and second low pressure chambers, and therefore, simplify the construction of the pump assembly.

In a thirteenth aspect of the present invention, there is provided a pump assembly including:

a housing;

a pump unit accommodated in a pump unit receiving portion, the pump unit receiving portion being formed in the housing and cooperating with the housing to define a low pressure chamber, the pump unit having a high pressure portion therewithin; and a discharge passage means extending across the low pressure chamber and communicating the high pressure portion of the pump unit and the housing with each other.

With this construction, the low pressure portion (low pressure chamber) can be formed on an outer circumferential side of the high pressure portion within the pump assembly. As a result, the low pressure portion and the high pressure portion can be arranged to overlap with each other with respect to the axial direction of the pump unit. Accordingly, an axial length of the pump unit can be reduced, thereby attaining downsizing of the pump assembly.

Further, the low pressure portion (low pressure chamber) can be formed between the pump unit and the housing. In other words, it is possible to form the high pressure portion so as not to be placed between the pump unit and the housing. Since seal members which seal the low pressure portion more readily ensure a sealability as compared to seal members which seal the high pressure portion, the seal members which seal the low pressure portion do not require a large allowance to thereby reduce a force to be applied to the pump unit upon inserting the pump unit into the housing. As a result, the pump assembly can be enhanced in assembling performance.

Further, even when there occurs leakage of the working fluid from the high pressure portion, the working fluid can be allowed to remain in the hydraulic circuit.

Furthermore, since the high pressure portion is not contacted with the housing, backlash of the pump unit relative to the housing can be suppressed. Accordingly, a fastening force to fix the pump unit to the housing can be reduced.

In a fourteenth aspect of the present invention, there is provided the pump assembly according to the thirteenth aspect, wherein the pump unit receiving portion is formed into a generally cylindrical recessed portion, the pump unit has a generally cylindrical shape and is a tandem gear pump including two gear pumps which are coaxially coupled to each other, wherein the pump unit includes a center plate disposed between the two gear pumps, and a communication member allowing the high pressure portion in each of the gear pumps to communicate with the housing through the center plate, wherein the low pressure chamber is disposed between the pump unit and a circumferential wall of the generally cylindrical recessed portion, the discharge passage means is formed by the communication member and arranged along a radial direction of the low pressure chamber so as to be symmetric with respect to an axis of the pump unit, the low pressure chamber is divided into a first low pressure chamber corresponding to one of the two gear pumps and a second low pressure chamber corresponding to the other of the two gear pumps by O-rings, the communication member is disposed in one of the first low pressure chamber and the second low pressure chamber, and wherein the pump assembly is used in a brake control apparatus, in which one of the gear pumps acts to increase a wheel cylinder pressure through a brake hydraulic circuit of a first brake pipe line and the other of the gear pumps acts to increase a wheel cylinder pressure through a brake hydraulic circuit of a second brake pipe line independent of the first brake pipe line.

With this construction, it is possible to collectively arrange both of the communication members on the side of one of the first and second low pressure chambers, and therefore, simplify the construction of the pump assembly.

With this construction, even when a problem such as crack occurs in one of the brake pipe lines, it is possible to increase the wheel cylinder pressure through the brake hydraulic circuit of the other of the brake pipe lines and thereby ensure the braking force.

This application is based on a prior Japanese Patent Application No. 2009-215912 filed on Sep. 17, 2009. The entire contents of the Japanese Patent Application No. 2009-215912 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A pump assembly comprising:
    a housing;
    a pump unit accommodated in a pump unit receiving portion which is formed in the housing, the pump unit having a low pressure portion and a high pressure portion therewithin;
    a suction passage formed in the housing, through which a working fluid is supplied to the low pressure portion of the pump unit;
    a low pressure chamber which is communicated with the suction passage and the low pressure portion; and
    a discharge passage through which the working fluid pressurized by the pump unit is discharged,
    wherein when the pump unit is accommodated in the pump unit receiving portion, the low pressure chamber is formed between the pump unit and a wall surface of the housing which defines the pump unit receiving portion, and
    the discharge passage is formed by a communication pipe which extends through the low pressure chamber and communicates the housing and the high pressure portion of the pump unit with each other,
    wherein the pump unit is a tandem gear pump comprising two gear pumps, the pump unit comprising a drive shaft which drives drive gears of the gear pumps, wherein the gear pumps are arranged along an axial direction of the drive shaft,
    wherein the two gear pumps are coaxially coupled to each other, the low pressure chamber is divided into a first low pressure chamber corresponding to one of the two gear pumps and a second low pressure chamber corresponding to the other of the two gear pumps by O-rings, and the communication pipe is disposed in each of the first and second low pressure chambers.

2. The pump assembly as claimed in claim 1, wherein the pump unit is formed into a generally cylindrical shape, the low pressure chamber is an annular space formed between an outer circumferential wall surface of the pump unit and the wall surface of the housing which defines the pump unit receiving portion, and the communication pipe is disposed along a radial direction of the annular space.

3. A pump assembly comprising:
    a housing;
    a pump unit accommodated in a pump unit receiving portion which is formed in the housing, the pump unit having a low pressure portion and a high pressure portion therewithin;
    a suction passage formed in the housing, through which a working fluid is supplied to the low pressure portion of the pump unit;
    a low pressure chamber which is communicated with the suction passage and the low pressure portion; and
    a discharge passage through which the working fluid pressurized by the pump unit is discharged,
    wherein when the pump unit is accommodated in the pump unit receiving portion, the low pressure chamber is formed between the pump unit and a wall surface of the housing which defines the pump unit receiving portion, and
    the discharge passage is formed by a communication pipe which extends through the low pressure chamber and communicates the housing and the high pressure portion of the pump unit with each other,
    wherein the pump unit is a tandem gear pump comprising two gear pumps, the pump unit comprising a drive shaft which drives drive gears of the gear pumps, wherein the gear pumps are arranged along an axial direction of the drive shaft,
    wherein the pump unit further comprises a center plate disposed between the gear pumps, and the communication pipe communicates the high pressure portion in each of the gear pumps with the housing through the center plate.

4. The pump assembly as claimed in claim 3, wherein the pump unit is formed into a generally cylindrical shape, the low pressure chamber is an annular space formed between an outer circumferential wall surface of the pump unit and the wall surface of the housing which defines the pump unit receiving portion, and the communication pipes are disposed along a radial direction of the annular space so as to be symmetric with respect to an axis of the pump unit.

5. The pump assembly as claimed in claim 4, wherein the low pressure chamber is divided into a first low pressure chamber corresponding to one of the two gear pumps and a second low pressure chamber corresponding to the other of the two gear pumps by O-rings, and the communication pipe corresponding to each of the two gear pumps is disposed in one of the first low pressure chamber and the second low pressure chamber.

6. The pump assembly as claimed in claim 5, wherein the pump assembly is used in a brake control apparatus, in which one of the gear pumps acts to increase a wheel cylinder pressure through a brake hydraulic circuit of a first brake pipe line and the other of the gear pumps acts to increase a wheel cylinder pressure through a brake hydraulic circuit of a second brake pipe line independent of the first brake pipe line.

7. The pump assembly as claimed in claim 4, wherein a one-way valve is built in the communication pipe, the one-way valve allowing the working fluid pressurized by the pump unit to flow only in a direction of discharge from the pump unit.

8. A pump assembly comprising:
    a housing;
    a generally cylindrical pump unit accommodated in a pump unit receiving portion, the pump unit receiving portion being formed in the housing, the pump unit cooperating with a wall surface of the housing which defines the pump unit receiving portion to define a low pressure chamber;
    a suction passage opened to an outer circumferential surface of the pump unit, through which a working fluid is supplied into the pump unit; and
    a discharge passage through which the working fluid pressurized by the pump unit is discharged to an outside of the housing;
    wherein the discharge passage is formed by a communication member which is exposed to the low pressure chamber and allows the pump unit and the housing to communicate with each other, wherein the pump unit is provided in the form of a tandem gear pump having two gear pumps which are coaxially coupled to each other, wherein the low pressure chamber is divided into a first low pressure chamber corresponding to one of the two gear pumps and a second low pressure chamber corresponding to the other of the two gear pumps by O-rings, and the communication member is disposed in one of the first low pressure chamber and the second low pressure chamber.

9. The pump assembly as claimed in claim 8, wherein the pump unit receiving portion is formed into a generally cylindrical recessed portion, the pump unit includes a center plate disposed between the gear pumps, the communication member allows the high pressure portion in each of the gear pumps to communicate with the housing through the center plate, the low pressure chambers are disposed between the pump unit and a circumferential wall surface of the generally cylindrical recessed portion, and the communication members are arranged along a radial direction of the low pressure chambers so as to be symmetric with respect to an axis of the pump unit.

10. The pump assembly as claimed in claim 9, wherein a one-way valve is built in the communication member, the one-way valve allowing the working fluid pressurized by the pump unit to flow only in a direction of discharge from the pump unit.

11. A pump assembly comprising:

a housing;

a pump unit accommodated in a pump unit receiving portion, the pump unit receiving portion being formed in the housing, the pump unit cooperating with a wall surface of the housing which defines the pump unit receiving portion to define a low pressure chamber, the pump unit having a high pressure portion therewithin; and a discharge passage means extending across the low pressure chamber and communicating the high pressure portion of the pump unit and the housing with each other, wherein the pump unit receiving portion is formed into a generally cylindrical recessed portion, and the pump unit has a generally cylindrical shape and is a tandem gear pump including two gear pumps which are coaxially coupled to each other, wherein the pump unit comprises a center plate disposed between the two gear pumps and a communication member allowing the high pressure portion in each of the gear pumps to communicate with the housing through the center plate, wherein the low pressure chamber is disposed between the pump unit and a circumferential wall of the generally cylindrical recessed portion, the discharge passage means is formed by the communication members and arranged along a radial direction of the low pressure chamber so as to be symmetric with respect to an axis of the pump unit, the low pressure chamber is divided into a first low pressure chamber corresponding to one of the two gear pumps and a second low pressure chamber corresponding to the other of the two gear pumps by O-rings, the communication members are disposed in one of the first low pressure chamber and the second low pressure chamber, and wherein the pump assembly is used in a brake control apparatus, in which one of the gear pumps acts to increase a wheel cylinder pressure through a brake hydraulic circuit of a first brake pipe line and the other of the gear pumps acts to increase a wheel cylinder pressure through a brake hydraulic circuit of a second brake pipe line independent of the first brake pipe line.

* * * * *